United States Patent
Chen

(10) Patent No.: US 7,950,804 B2
(45) Date of Patent: May 31, 2011

(54) SYSTEM AND METHOD EMPLOYED IN PROJECTOR FOR PROTECTING EYES

(75) Inventor: Sheng-Hung Chen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 561 days.

(21) Appl. No.: 12/106,530

(22) Filed: Apr. 21, 2008

(65) Prior Publication Data

US 2009/0115969 A1     May 7, 2009

(30) Foreign Application Priority Data

Nov. 1, 2007   (CN) .......................... 2007 1 0202356

(51) Int. Cl.
   *G03B 21/26* (2006.01)
   *G03B 23/00* (2006.01)
   *G06K 9/46* (2006.01)
   *G06K 9/36* (2006.01)

(52) U.S. Cl. .............. 353/28; 353/30; 353/25; 382/203; 382/292; 345/156

(58) Field of Classification Search .................... 353/28, 353/30, 25; 382/203, 292; 345/156
See application file for complete search history.

(56) References Cited

U.S. PATENT DOCUMENTS

| 6,286,958 B1 | 9/2001 | Koest et al. |
| 6,945,653 B2 * | 9/2005 | Kobori et al. .................. 353/30 |

FOREIGN PATENT DOCUMENTS

CN            1523439 A      8/2004

* cited by examiner

*Primary Examiner* — Georgia Y Epps
*Assistant Examiner* — Magda Cruz
(74) *Attorney, Agent, or Firm* — Andrew C. Cheng

(57) ABSTRACT

A system employed in a projector for protecting eyes when the projector is in use, includes an initialization module, a light emitting-receiving device, a time-measuring module, a comparison module, and an image-outputting device. The initialization module is configured for initializing a standard time value. The light emitting-receiving device is configured for emitting a light and receiving a reflection of the light. The time-measuring module is configured for measuring time elapsed between emitting the light and receiving the reflection to generate a time-cost value. The comparison module is configured for comparing the standard time value with the time-cost value to generate a signal. The image-outputting device is configured for outputting an eye-protective image or a general image corresponding to the signal.

7 Claims, 3 Drawing Sheets

SYSTEM AND METHOD EMPLOYED IN PROJECTOR FOR PROTECTING EYES

RELATED FIELD

The present invention relates to a system and method for protecting eyes, in particular, to a system and method employed in a projector for protecting eyes during operation of the projector.

BACKGROUND

Projectors are used for projecting an optical image by modulating light emitted from a light source according to image information. The projectors may be used for presentations in conferences or the like in conjunction with a personal computer. Also, in response to a desire to view movies or the like, on a large screen at home, this kind of projector may be used for a home theater. However, when someone passes between the projector and the large screen, the light emitted from the light source, such as a metal halide lamp, a high-pressure mercury lamp, or the like, may strike that persons eyes and cause discomfort.

SUMMARY

In accordance with an embodiment of the present invention, a system employed in a projector for protecting eyes when the projector is in use, includes an initialization module, a light emitting-receiving device, a time-measuring module, a comparison module, and an image-outputting device. The initialization module is configured for initializing a standard time value. The light emitting-receiving device is configured for emitting a light and receiving a reflection of the light. The time-measuring module is configured for measuring time elapsed between emission of the light and receiving the reflection to generate a time-cost value. The comparison module is configured for comparing the standard time value with the time-cost value to generate a signal. The image-outputting device is configured for outputting an eye-protective image or a general image according to the signal.

Other novel features and advantages will become more apparent from the following detailed description when taken in conjunction with the accompanying drawings.

BRIEF DESCRIPTION OF THE DRAWINGS

The present invention is described in detail hereinafter, by way of example and description of exemplary embodiments thereof and with reference to the accompanying drawings, in which.

DETAILED DESCRIPTION OF THE PREFERRED EMBODIMENTS

A detailed explanation of a system employed in a projector for protecting eyes according to an embodiment of the present invention will now be made with reference to the drawings attached hereto.

Figure 1:
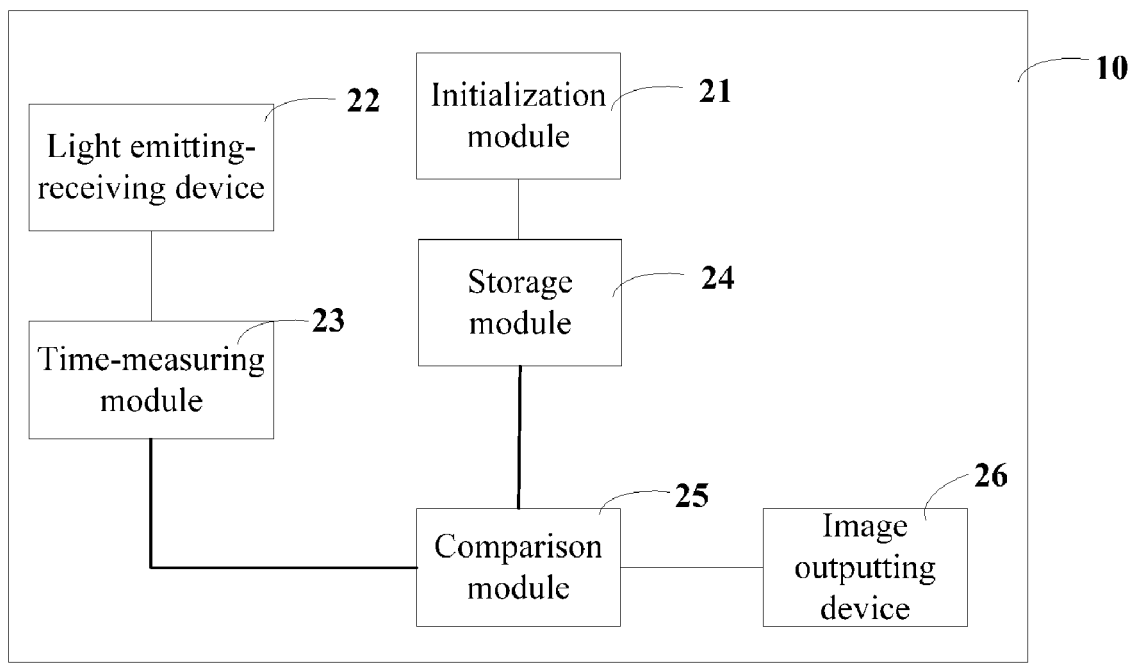
FIG. 1 is a block diagram of a system employed in a projector for protecting eyes according to an exemplary embodiment.

Referring to FIG. 1, a system 10 according to an exemplary embodiment of is shown. The projector may be one of a liquid crystal display (LCD) projector, a digital light processing (DLP) projector, a liquid crystal on silicon (LCoS) projector, or another type of projector. In the exemplary embodiment, the projector is a DLP projector presented only as an example to explain configurations and working principles of the system 10. The system 10 includes an initialization module 21, a light emitting-receiving device 22, a time-measuring module 23, and a comparison module 25 electronically connected to an image-outputting device 26.

It should be noted that an image projected by the projector should be projected onto a screen or other similar surface. When a person passes between the projector and the screen, part of the light emitted from the light emitting-receiving device 22 will be projected onto the person and reflected back. And so, a travel distance of the part of the light emitted from the light emitting-receiving device 22 is decreased. Correspondingly, time elapsed between departure of the light emitted from the light emitting-receiving device 22 and return of a reflection of the part of the light to the light emitting-receiving device 22 is also decreased.

The light emitting-receiving device 22 is configured for emitting the light toward the screen and receiving the reflection light from the screen or the person. The light emitted from the light emitting-receiving device 22 can be infrared light.

The initialization module 21 is configured for initializing a standard time value according to actual conditions. The standard time value is a period of time required for the light to travel from the light emitting-receiving device 22 to the screen and back again to the light emitting-receiving device 22, and is a basis used to judge if the light emitted from the light emitting-receiving device 22 strikes an object between the projector and the screen.

The time-measuring module 23 is electronically connected to the light emitting-receiving device 22 and is configured for timely measuring the travel time of the light that elapses between departure of the light from the emitting-receiving module 22 and return of the light to generate a time-cost value.

The comparison module 25 is configured for comparing the time-cost value with the standard time value for generating a signal, and for transmitting the signal to the image-outputting device 26. When the standard time value is equal to the time-cost value, a normal-signal is generated, which indicates that no person or object is between the screen and the projector. When the standard time value is greater than the time-cost value, a stop signal is generated, which indicates that someone or something is between the screen and the projector.

The image-outputting device 26 is electronically connected to the comparison module 25 and configured for outputting an image according to the signal from the comparison module 25. When the signal of the comparison module 25 is the normal-signal, the image-outputting device 26 outputs normally. When the signal is the stop signal, the image-outputting device 26 outputs an alternate image, which may be stored in the projector, and is less intense for protecting eyes of the person currently between the projector and the screen.

It can be appreciated that the system 10 can also include a storage module 24. The storage module 24 is electronically connected to the comparison module 25 and the initialization module 21 and is configured for storing the standard time value generated by the initialization module 21. Understandably, when the distance between the screen and the projector is fixed, calculation of a new standard time each time the projector is used is not needed.

Figure 2:
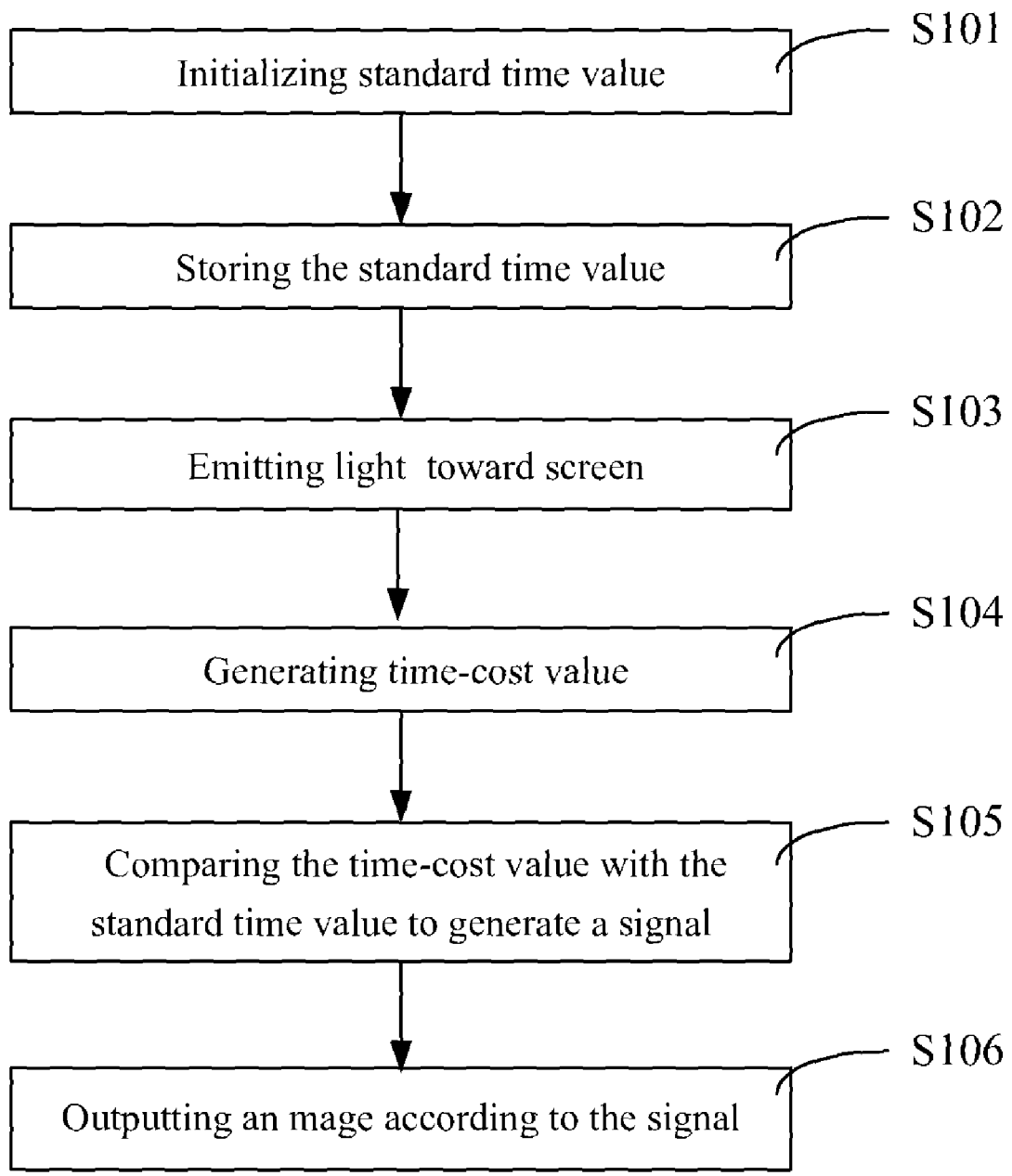
FIG. 2 is a flow chart of an exemplary method for protecting eyes when the projector is in use, utilizing the system of FIG. 1.
Figure 3:
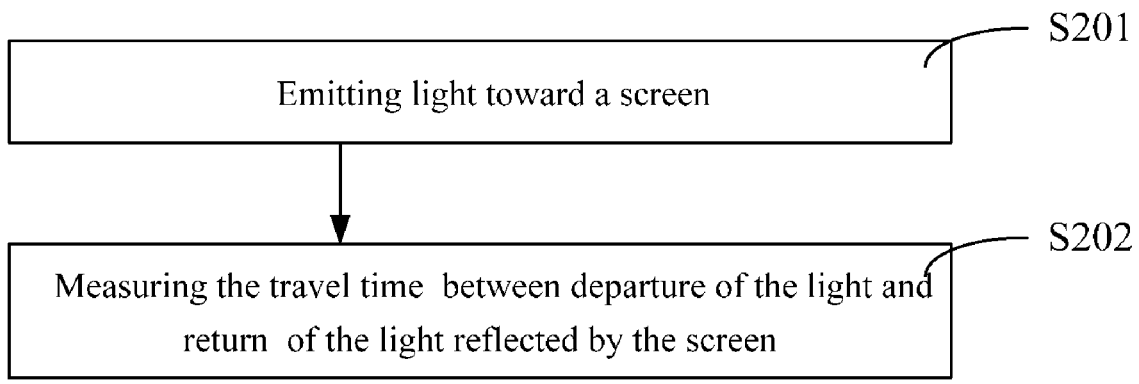
FIG. 3 is a flow chart of steps for initializing a standard time value, according to the method of FIG. 2.

Referring to FIG. 2, a flow chart of an exemplary method for protecting eyes of people when they pass between the screen and the projector during use of the projector is shown. The method includes:

step S101: initializing the standard time value;

step S102: storing the standard time value in the storage module 24;

step S103: emitting the light from the light emitting-receiving device 22 toward the screen and receiving a reflection of the light from the screen or someone or something between the projector and the screen;

step S104: measuring the travel time of the light between departure from the light emitting-receiving module 22 and return of the light to generate the time-cost value;

step S105: comparing the time-cost value with the standard time value to obtain a signal; and step S106: outputting the alternate image according to the signal.

In step S101, the initialization of the standard time value may be carried out when the projector is turn on. Referring to FIG. 4, a flow chart of steps for initializing the standard time value includes:

step S201: emitting light toward a screen and receiving a reflection of the light from the screen; and step S202: measuring the travel time of the light from departure from the light emitting-receiving module 22 to return to the emitting-receiving device 22.

The system first detects if someone or something has come between the projector and the screen through the comparison module 25, and second, controls the image-outputting device 26 to output a normal image when nothing or no one is between the projector and the screen, or an alternate eye-protection image when someone or something is between the projector and the screen according to a signal outputted from the comparison module 25. Therefore, when someone passes before the projector, their eyes are automatically protected.

It should be understood that the above-described embodiment are intended to illustrate rather than limit the invention. Variations may be made to the embodiments without departing from the spirit of the invention. Accordingly, it is appropriate that the appended claims be construed broadly and in a manner consistent with the scope of the invention.

What is claimed is:

1. A system employed in a projector for protecting eyes when the projector is in use, the system comprising:

an initialization module configured for initializing a standard time value;

a light emitting-receiving device configured for emitting a light and receiving a reflection of the light emitted;

a time-measuring module configured for measuring time elapsed between emitting the light and receiving the reflection to generate a time-cost value;

a comparison module configured for comparing the standard time value with the time-cost value to generate a signal; and an image-outputting device configured for outputting an eye-protective image or a general image according to the signal.

2. The system as claimed in claim 1, further comprising a storage module configured for storing the standard time value from the initialization module, the storage module electronically connected to the comparison module and the initialization module, respectively.

3. The system as claimed in claim 1, wherein the light emitted by the light emitting-receiving device is infrared light.

4. The system as claimed in claim 1, wherein the eye-protective image is a black image.

5. A method for protecting eyes when a projector is in used, the method comprising:

initializing a standard time value;

emitting a light toward an object and receiving a reflection of the light from the object;

measuring time elapsed between emitting the light and receiving the reflection to generate a time-cost value;

comparing the time-cost value with the standard time value to obtain a signal; and outputting an eye-protective image or a general image corresponding to the signal.

6. The method as claimed in claim 5, wherein initializing the standard time value comprises;

emitting light toward a screen and receiving a reflection of the initial light from the screen; and measuring time elapsed between emitting the light and receiving the reflection to generate the standard time value.

7. The method as claimed in claim 5, further comprising a step of storing the standard time value after initializing the standard time value by the initialization module.

* * * * *